Nov. 17, 1953

A. G. JOHNSON ET AL 2,659,565

CYLINDER VALVE

Filed Oct. 5, 1950

INVENTORS
THEODORE A. ST. CLAIR
& ANDREW G. JOHNSON
BY
Richey T Watts
ATTORNEYS

Patented Nov. 17, 1953

2,659,565

UNITED STATES PATENT OFFICE 2,659,565

CYLINDER VALVE

Andrew G. Johnson, Lakewood, and Theodore A. St. Clair, South Euclid, Ohio, assignors to The Weatherhead Company, Cleveland, Ohio, a corporation of Ohio Application October 5, 1950, Serial No. 188,539

1 Claim. (Cl. 251—24)

This invention relates to valves and more particularly to manually-operated valves, sometimes referred to as cylinder valves.

The principal object of the present invention resolves in improving the seating action of the valve, more specifically, in providing a valve that is leak-proof at all times, dependable, and long lasting. Engaging valve and valve seat members may be designed between two extreme conditions. On one hand the members may be made of extremely hard material in order to produce long life and withstand abuse due to excessive setting-up pressure on the valve handle. However, in this construction the seating surfaces must be accurately ground or lapped together to provide sealing and a slight deposit of foreign matter between the members may cause leakage between them. On the other hand, one or both of the valve and seat members may be made of soft resilient material, such as rubber. Here, the sealing action is very good, but the rubber, being relatively soft and resilient, is easily damaged by excessive pressure urging the rubber against its seat so that the life of such a valve cannot compare with one having the hard seat structure previously mentioned.

In accordance with the present invention the advantages of both constructions are obtained. A rubber valve member is employed for action against a metal seat, the valve member simultaneously acting as a diaphragm to eliminate the usual packing on the stem. In order to prevent excessive pressure from being exerted against the rubber when closing the valve, which would materially shorten the life of the valve, a hard disc, such as a metal washer, Bakelite washer, or the like, is employed to retain the rubber member in its mounting and the valve seat is counterbored to provide a shoulder which may be engaged by the hard disc. The parts are so proportioned that the shoulder is not engaged by the disc until the rubber has been compressed firmly against the seat so as to provide an effective fluid seal. No further compression or stresses of the rubber may be applied due to operation of the valve handle because the force is taken up by the engagement of the disc with the shoulder within the seat.

Another object of the invention resides in lengthening the life of the rubber valve seat members. This is accomplished by forming the hard disc and the shoulder against which it seats as an ordinary machined joint so that fluid under pressure may leak past the area of engagement of the parts and find its way to the rubber diaphragm. Thus, if the valve must withstand pressure over a long period of time, such pressure will tend to relieve the force between the rubber member and the seat due to the fluid pressure action against the rubber member. Since there is but a small clearance between the washer and the seat, this pressure acts over a small area. The action of the pressure tending to force the rubber valve member away from the seat is not as great as if the pressure exerted on the rubber were against the entire internal diameter of the seat. Accordingly, the initial setting-up pressure between the rubber member and the seat will not be as high as it would if the member were exposed to the pressure within the valve across the diameter of the seat. As a result of this the average force exerted between the rubber member and the valve seat is less than would be expected.

The manner in which these and other objects may be accomplished will be apparent from the following detailed description of a preferred embodiment of the invention.

Figures 1, 2:
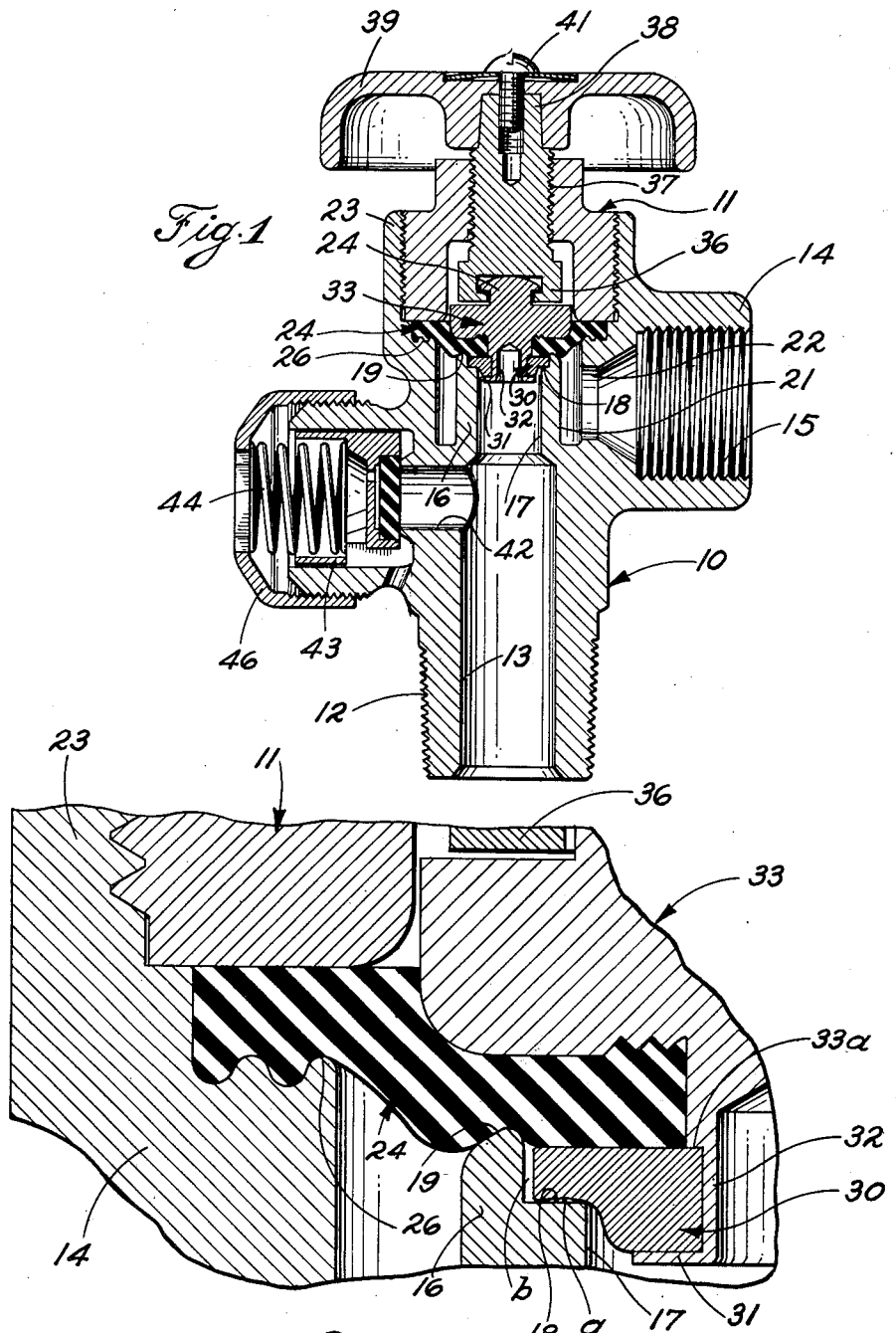
Fig. 1 is a section through the valve.
Fig. 2 is an enlarged fragmentary section in the area of the valve seat.

The valve comprises two major parts, a body 10, preferably formed of malleable cast iron, and a bonnet member 11, which retains the valve mechanism in the body. The valve body has a threaded attaching nipple 12 for connection to a tank or other source of fluid, and there is an axial bore 13 in the body serving as a fluid inlet. The body has a radial outlet nipple 14 threaded as at 15 for connection to a fitting, the outlet nipple being configured for sealing engagement with fittings of any desired type, or in some applications the outlet nipple may be a plain nipple.

A sleeve-like member 16 forms the terminal portion of bore 13 and has bore 17 formed therein, which is a continuation of bore 13. The upper end of sleeve 16 is counterbored to provide a shoulder 18 and is machined to provide a curved seat 19 which serves as a valve seat. There is a counterbore 21 surrounding sleeve 16 and communicating with outlet passage 22 leading to the threaded bore 15 of the outlet nipple.

The body is formed with a threaded section 23 into which is screwed the bonnet 11, the bonnet clamping a member 24 made of rubber or rubber-like material against a corrugated shoulder or base 26 surrounding the counterbore 21 formed in the valve body. The rubber member 24 serves the dual function of a packless valve diaphragm and a soft-type valve disc, and although the composition of the member 24 will vary with the fluid passing through the valve, for application where in the rubber is subject to the deteriorating effects of organic compounds and solvents such as liquefied petroleum gas, a synthetic rubber such as the material known in the trade as "Hycar" has been found to give excellent service. The member 24 is mounted on the valve stem by means of a special disc or flange 30 in turn retained by a spun-over lip 31 on the shank 32 of a disc-like member 33 that serves to move the diaphragm toward and away from the valve seat 19. The shank of member 33 is formed with a shoulder 33a that acts as a stop during the spinning operation applied to lip 31 and limits the compressive load applied to the rubber diaphragm 24.

The construction just described (when proper clearances are provided) provides for a self-aligning action of the valve member. When flange or disc 30 engages the shoulder 18, it brings itself into alignment with valve body and seat 19 so that there is always a uniform engagement between rubber member 24 and the seat 19, and member 24 need not be relied upon to perform the aligning function in case member 33 sticks somewhat in its socket in the valve stem. Thus, the force urging the rubber valve member against the valve seat 19 is uniform around the periphery of the latter when the valve is fully closed. The valve member and diaphragm are moved to and from the valve seat by means of a threaded stem 37 mounted in complementary threads in the bonnet 11, and the stem terminates in a tapered shank 38 received in a similar socket in the valve handle 39, which provides a driving fit when the valve handle is axially retained in place by means of a retaining screw 41.

A relief valve may be incorporated in the valve body to exhaust excess pressure from a port 42 formed in the body. This valve includes the poppet 43, held against its seat by spring 44, the spring being retained by the adjustable spring retainer cap 46 threaded to the body. Details of the relief valve form no part of the invention, suitable constructions being described in the copending applications of Theodore A. St. Clair, Serial No. 58,563, filed November 5, 1948, now Patent No. 2,527,381, October 24, 1950 and Andrew G. Johnson, Serial No. 785,939, filed November 14, 1947, now Patent No. 2,611,390, September 23, 1952.

As can best be seen in Fig. 2, there is a small clearance "b" around the periphery of the disc 31, and diagrammatically illustrated is a small clearance "a" between the disc and the shoulder 18 that exists due to inherent manufacturing tolerances. In other words, no effort is made to machine the mating surfaces of the disc and the valve body accurately enough to cause a seal to take place at "a". Thus, fluid under pressure within the bore 17 may find its way past the disc 31 and be exerted on the underside of the diaphragm 24. This pressure acts to remove some of the stress imparted to the rubber due to closing of the valve by the parts proportioned so that enough stress remains to seal the intended pressure.

When the valve is closed from an open position the parts are arranged so that the diaphragm 24 initially engages the seat 19 and a certain amount of deformation of the rubber and stressing thereof in the zone of the seat takes place before flange 31 engages the shoulder 18. The mounting of valve member 33 in its socket is such that comparatively little universal movement is provided for, only a small amount of such movement being required if ordinary care is taken in machining the parts. Thus, there will be but little localized stress on rubber member 24 even if valve member 33 is cocked to one side and is not perfectly free in its socket. As soon as flange 30 engages shoulder 18 it begins to align the parts, and by the time full engagement of the flange and shoulder 18 occurs, enough sealing stress has been imparted by seat 19 to the rubber to give a uniform and adequate sealing action against fluid pressure. The parts are dimensioned so that rubber member 24 is under enough compression to provide a seal even though pressure within the valve tends to reduce the sealing force between the rubber member and its seat.

The engagement of the disc 30 with its shoulder 18 acts as a positive mechanical stop and prevents the user of the valve from inadvertently overstressing the rubber diaphragm when closing the valve. Without the disc arrangement described, the powerful mechanical advantage of the thread on the valve stem could readily force the rubber against the valve seat 19 with enough force to destroy or damage the rubber member. Thus, the rubber member may be made relatively soft, rubber of about 60–70 durometer being satisfactory. The construction shown also has the advantage that the tube 16 is relatively large in diameter and presents less obstruction to flow than prior valves of this type.

Having described in detail a preferred form of the invention so that others skilled in the art may practice the same, it will be apparent that various modifications may be made from the disclosed embodiment without departing from the essence of the invention.

What is claimed is:

A valve comprising a body, an inlet port, an outlet port, and an annular valve seat between said ports, one of said ports opening into the center of said valve seat, a counterbore axially and radially within said seat forming an annular shoulder around said one of said ports, a second counterbore surrounding said seat, a diaphragm base around said second counterbore, a valve member mounted in said body for motion toward and away from said seat, a diaphragm-like valve disc of rubber-like material, an annular nut in said body clamping said disc against said diaphragm base, means mounting said disc on said valve member including an annular flange member of relatively hard material, said flange member having an external diameter slightly less than the diameter of said first named counterbore and greater than the diameter of said one of said ports, means securing said flange member to said valve member against movement in either direction, said disc being movable by said valve member into engagement with said seat, said flange member being movable with said valve member and into engagement with said shoulder, said last-named engagement taking place after said valve seat has deformed said rubber-like disc member and made a sealing engagement therewith.

ANDREW G. JOHNSON.
THEODORE A. ST. CLAIR.

References Cited in the file of this patent

UNITED STATES PATENTS

| Number | Name | Date |
|---|---|---|
| Re. 19,151 | Saunders | May 1, 1934 |
| 1,385,058 | Warter | July 19, 1921 |
| 2,197,455 | Volpin | Apr. 16, 1940 |
| 2,216,292 | Eveleth | Oct. 1, 1940 |
| 2,400,861 | Wolcott | May 21, 1946 |

FOREIGN PATENTS

| Number | Country | Date |
|---|---|---|
| 10,404 | Great Britain | of 1902 |
| 596,533 | Great Britain | of 1948 |